United States Patent

Orrell, Jr.

[15] 3,678,194

[45] July 18, 1972

[54] DIGITAL DATA TRANSMISSION AND DETECTION SYSTEM

[72] Inventor: Irving F. Orrell, Jr., Whittinsville, Mass.

[73] Assignee: The United States of America as represented by the Secretary of the Army

[22] Filed: Jan. 26, 1971

[21] Appl. No.: 109,875

[52] U.S. Cl. ............................................178/68, 325/38 A

[51] Int. Cl. ....................................................H04l 15/00

[58] Field of Search....................178/68, 66; 325/38 A, 141, 325/142, 143, 321, 325, 30, 163, 320

[56] References Cited

UNITED STATES PATENTS

| | | | |
|---|---|---|---|
| 3,530,385 | 9/1970 | Smith et al | 178/DIG 3 |
| 3,548,325 | 12/1970 | Salter et al | 178/DIG 3 |
| 3,587,088 | 6/1971 | Francszek | 325/38 A |

*Primary Examiner*—Robert L. Griffin
*Assistant Examiner*—Barry Leibowitz
*Attorney*—Harry M. Saragovitz, Edward J. Kelly, Herbert Berl and Aubrey J. Dunn

[57] ABSTRACT

Information stored in a shift register in the form of data bits is serially read out to a logical circuit including gates, pulse stretchers, a storage flip-flop, a NOR gate, and a resistor summer. The output of the summer is connected to an operational amplifier feeding signals to a wire transmission line or a radio transmitter. The logical circuit is connected such that "0" data bits appear as zero voltage levels on the transmission line, and "1" bits appear as +V levels on the line. Space pulses are additionally provided between the data bits as +2V levels on the line, and an end-of-message level of +3V is provided when the last bit is read from the shift register. The voltage levels are maintained during transmission by suitable amplifiers or may be restored at the receiver. The receiver inverts the incoming signals and adds +V. Voltage comparators are fed the resulting signal, and provide outputs for data bits, shift pulses, and end-of-message pulses.

4 Claims, 4 Drawing Figures

Irving F. Orrell,
INVENTOR.

BY Harry M. Saragovitz
Edward J. Kelly
Herbert Berl
Aubrey J. Dunn

Irving F. Orrell,
INVENTOR.
BY Harry M. Saragovitz
Edward J. Kelly
Herbert Berl
Aubrey J. Dunn

DIGITAL DATA TRANSMISSION AND DETECTION SYSTEM

BACKGROUND OF THE INVENTION

There are many known schemes for transmitting pulsed data between separated stations. Telegraphy is the classic example. Since the advent of digital computers, it has become necessary to transmit large amounts of digital data. Many schemes are also known for this. The usual schemes are adaptations of telegraph schemes and are not set up to use standard logic family and operational amplifier techniques. The instant invention uses these techniques to advantage.

SUMMARY OF THE INVENTION

This invention is a system for transmitting and detecting digital data using logic circuits and operational amplifier techniques from computers. The transmitter extracts stored bits from a shift register and feeds them through logic circuitry to an operational amplifier connected to a transmission line (or transmitter in a radio link). The logic circuitry causes the amplifier to give OV signals for "0" data bits and +V signals for "1" bits. Space signals of +2V are given between data bits, and a +3V end-of-message signal after the last bit is extracted from the shift register. At the other end of the transmission line (or at a receiver in the radio link), the signals are inverted, +V is added, and the resulting signal is fed into two voltage comparators. One comparator detects data bits and the other detects shift pulses. A third comparator is fed the resulting signal, but with an additional +V added. The third comparator detects end-of-message signals.

DESCRIPTION OF THE PREFERRED EMBODIMENT TRANSMITTER

Figure 1:
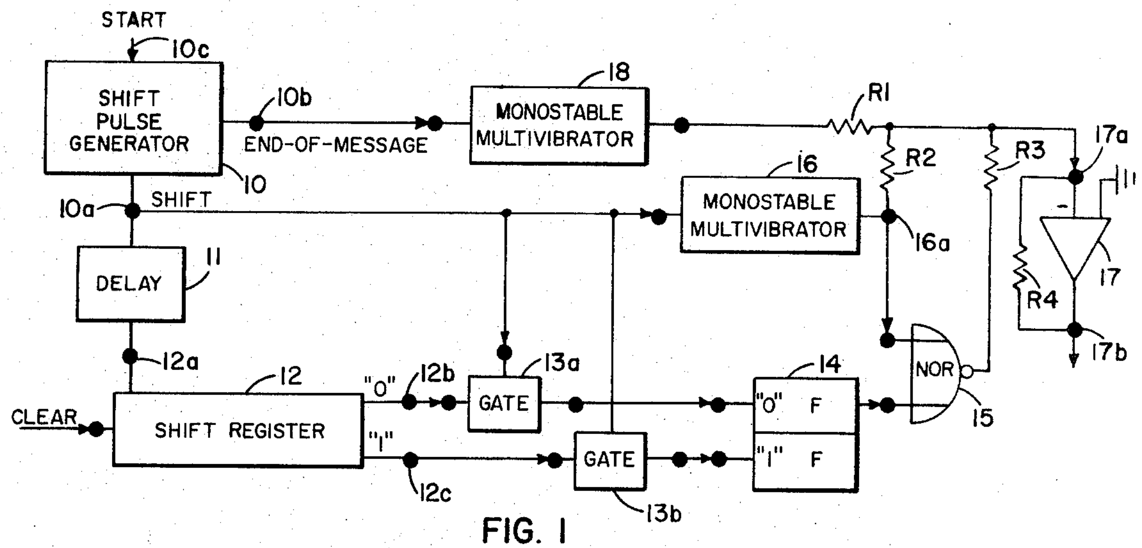
FIG. 1 shows a schematic diagram of the transmitter of the invention.

Referring to FIG. 1, the transmitter includes shift pulse generator 10 having output terminals 10*a* and 10*b*. The generator may be started by a pulse through line 10*c*. Terminal 10*a* of generator 10 provides shift pulses to shift terminal 12*a* of shift register 12 through delay 11. It should be understood that register 12 may have bits fed thereto serially or in parallel, as desired. In either event, the register is assumed to be full for transmission. Pulses fed to shift terminal 12a cause the bits in the register to shift from left to right, and successively appear as outputs from terminals 12*b* and 12*c*, depending on whether the bits are respectively "0's" or "1's". The outputs of 12*b* and 12*c* are respectively fed to signal input terminals of gates 13*a* and 13*b*. As can be seen, terminal 10*a* of generator 10 is connected to input terminals of gates 13*a* and 13*b*. The outputs of gates 13*a* and **13 *b* feed storage flip-flop 14. The "0" output 14 feeds an input of NOR GATE 15. The other input of 15 is connected to terminal 16***a* of delay 16 and is fed shift pulses from terminal 10*a* through pulse stretcher 16, which may take the form of a monostable multivibrator. The output of 15 is fed to resistor R3 of the resistor summer consisting of resistors R1, R2, and R3. One end of each of the resistors is connected to input terminal 17*a* of operational amplifier 17. This amplifier has feedback resistor R4. The other end of R2 is connected to terminal 16*a*. The other end of R1 is connected through pulse stretcher 18, which may be similar to 16, to terminal 10*b* of generator 10. Terminal 10*b* provides an end-of-message signal pulse when sufficient shift pulses have been generated to extract the data bits from shift register 12.

Figure 2:
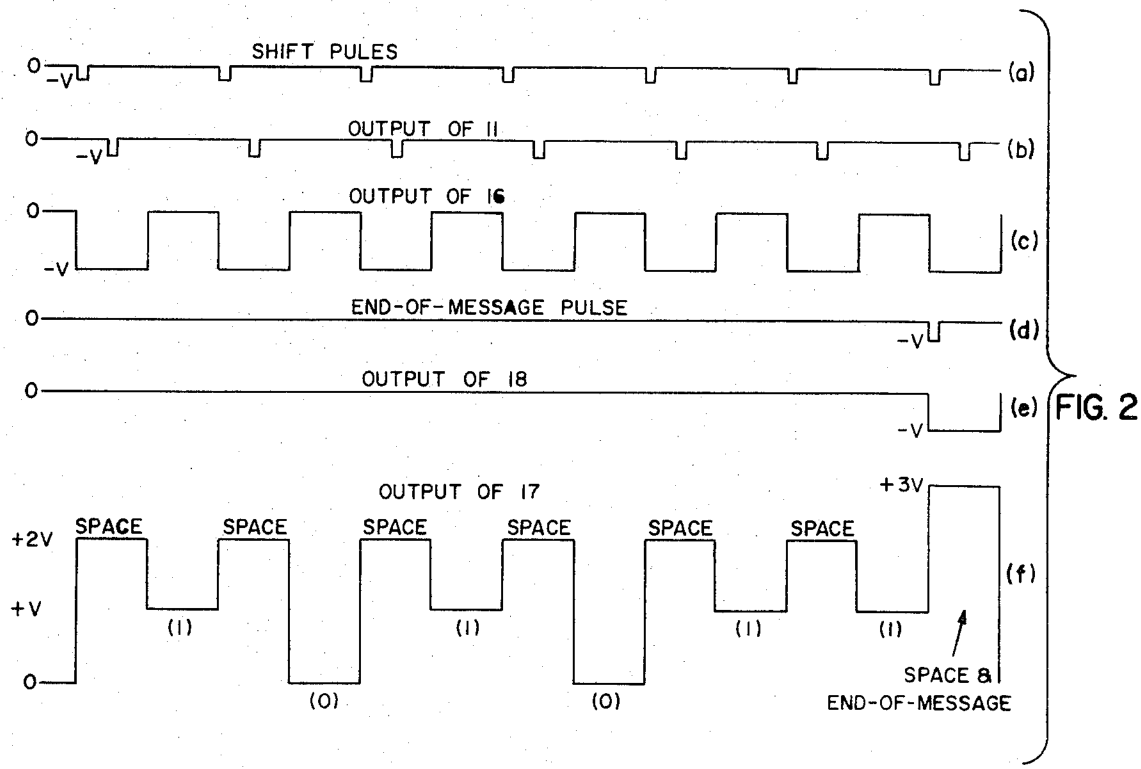
FIG. 2 shows typical voltage waveforms of the transmitter.

Operation of the FIG. 1 circuit may be more easily understood by referring to the waveforms of FIG. 2. The pulses at terminal 10a of generator 10 are shown by waveform (*a*) of FIG. 2. These pulses pass through delay 11 and appear at shift terminal 12*a* of shift register 12. The delayed shift pulses applied to 12*a* allow unambiguous readout of register 12. The delayed pulses are shown by (b) of FIG. 2. The shift pulses are also applied to gates 13*a* and 13*b* and allow these gates to open and set flip-flop 14 in accordance with the potentials at output terminals 12*b* and 12*c* of register 12. Moreover, these same pulses are applied to the input terminal of monostable multivibrator 16. The output at terminal 16*a* of multivibrator 16 has the waveform shown in (*c*) of FIG. 2. The output from 16*a* is applied to resistor R2, and causes amplifier 17 to have a +2V level at terminal 17*b*. It should be realized that the waveforms of FIG. 2 are not to scale vertically, and waveform (*f*) shows merely the relative values of the various output conditions of amplifier 17. Absolute values of voltages of the FIG. 2 waveforms are not essential to understanding the invention, and have been omitted. The values of resistors R1, R2, R3, and R4 are such that $R1 = 2(R2) = R3 = R4$ in order to obtain the proper outputs from 17. Amplifier 17 maintains its +2V level as long as multivibrator 16 has its output at −V. The +V output of 16 also keeps the output of NOR gate 15 low. NOR 15 has a high output of −V only when both its inputs have OV inputs, and goes to a OV output when either input goes to −V. When multivibrator 16 completes its cycle of operation, and its output rises to OV, the output of 17 will be dependent on whether a "0" or "1" is set in flip-flop 14. If a "1" had been fed into flip-flop 14 from terminal 12*c*, through gate 13*b* by the delayed shift pulse, NOR gate 15 will change to a −V output when the output of multivibrator 16 rises to 0V. Conversely, if a "0" were set in flip-flop 14, the output of 15 would remain at 0V after multivibrator 16 cycled. Obviously, the output of 17 would be 0V. Waveform (f) of FIG. 2 shows the output of 17 for a 1 0 1 0 1 1 logical sequence. This sequence is shown as only six bits long, but could be any desired length, as determined by the number of stages in shift register 2. At the end of the message, the end-of-message pulse from output 10*b* of generator 10 is applied to monostable multivibrator 18. This multivibrator has the same period as multivibrator 16. The outputs of the two multivibrators are both at a −V level at the end-of-message pulse. Since $R1 = 2(R2)$, the output of 17 goes to +3V. The output of 17 may be connected to a transmission line, or may modulate a radio transmitter.

RECEIVER

Figure 3:
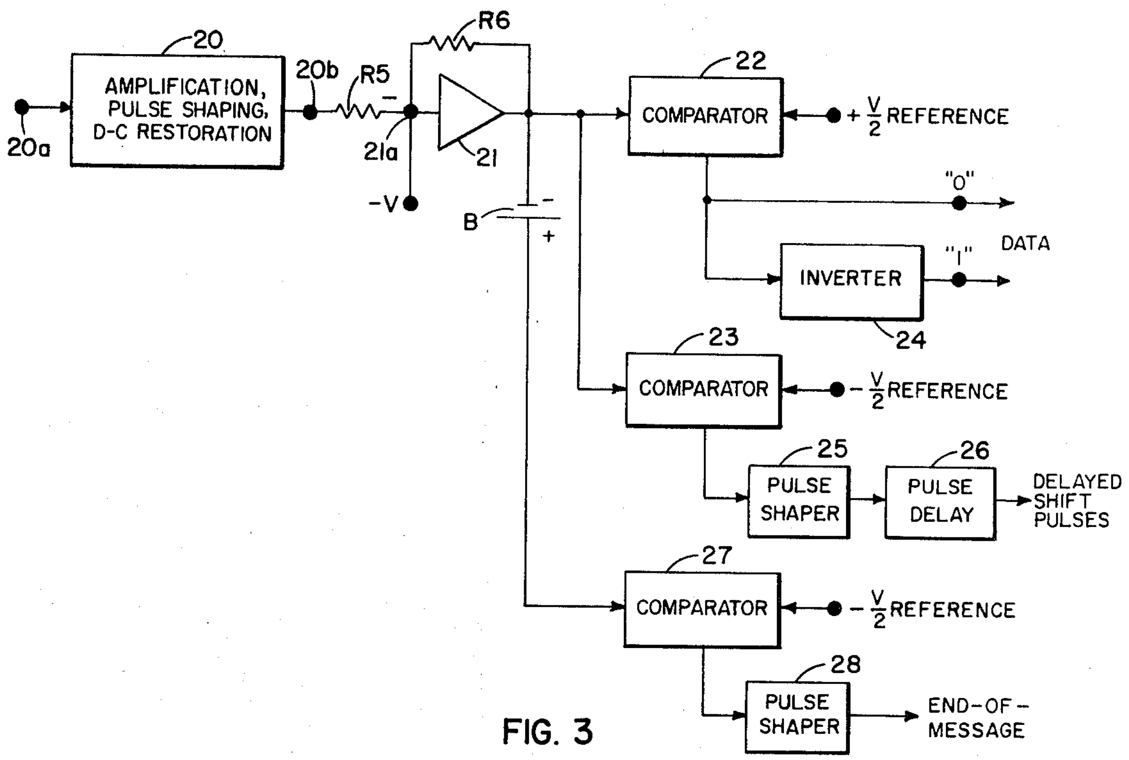
FIG. 3 shows a schematic diagram of the receiver of the invention.
Figure 4:
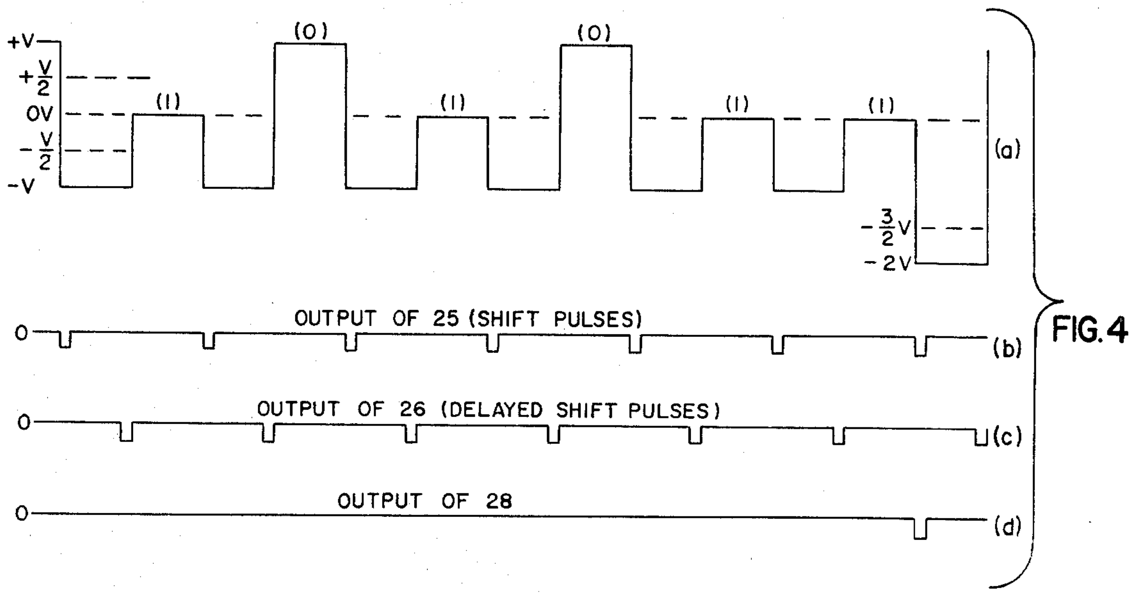
FIG. 4 shows typical voltage waveforms of the receiver.

The receiver as shown in FIG. 3 includes means 20 for performing the functions of amplifying, shaping, and D-C restoration on signals from the transmitter. The means for performing these functions are all well known in the communications art, and do not comprise part of the invention. For the sake of the invention it may be assumed that signals appearing at terminal 20*b* are identical to the signals at 17*b* of FIG. 1. If a radio link were used between the transmitter and receiver, obviously a detector and its associated circuitry would be necessary to properly prepare the signals for application to terminal 20b. The signals at terminal 20*b* are applied through resistor R5 to input terminal 21*a* of amplifier 21, which amplifier has feedback resistor $R6$. For the invention, $R5 = R6$. Also applied to input 21*a* is voltage −V. Amplifier 21 therefore inverts and adds +V to the incoming signals, to give the voltage waveform as shown at (*a*) in FIG. 4. This voltage is applied to comparators 22 and 23, the outputs of which respectively represent the data and the shift pulses. Comparator 22 has a +V/2 reference voltage, and detects any voltage excursions in waveform (*a*) which exceed this level. As can be seen, only the "0" bits exceed this level. Compatator 22 this provides a "1" output except when a "0" occurs. The output of 22 feeds a "0" data line, and a "1" data line through inverter 24. These data lines may feed a receiving shift register (not shown). Comparator 23 has a −V/2 reference voltage, and has an output for each space pulse. This output is shortened in pulse shaper 25, and delayed in pulse delay 26. The output of 26 is therefore a recreation of the shift pulses of the transmitter, and may be applied to the same shift register (not shown) to which the data pulses from comparator 22 are applied. The pulse shaper may take the form of a differentiator feeding a rectifier. A third comparator, 27, is included in the receiver, and is fed signals from amplifier 21, with +V added by battery B. A reference voltage of −V/2 is also fed to comparator 27, and the comparator has an output only for those portions of waveform (*a*) of FIG. 4 which exceed the −3V/2 level. Obviously, the only portion of the waveform that exceeds this level is the end-of-message pulse. The output of 27 is applied to a pulse shaper, which may take the same form as shaper 25. The output of 27 is therefore a recreation of the pulses at 10*b* in FIG. 1. Waveforms (*b*), (*c*), and (*d*) of FIG. 4 show the shape of the voltage outputs of circuit elements 25, 26, and 28.

I claim:

1. A communication system for transmitting binary data as multilevel pulses including a transmitter and a receiver, wherein said transmitter comprises:

storage means for storing said data including a shift register having plural stages equal to the number of bits of data and having two data outputs, a shift input, and a data input;

pulse generating means providing shift pulses at a first output, and end-of-message pulses at a second output, said end-of-message pulses being generated upon the generation of the same number of shift pulses as there are stages in said shift register;

means connecting the first output of said pulse generating means to said shift input of said shift register;

first and second pulse stretcher means each having an output and each having an input;

means connecting the first output of said pulse generating means to the input of said first pulse stretcher means;

means connecting the second output of said pulse generating means to the input of said second pulse stretcher means;

flip-flop means having an output and two inputs; means connecting the outputs of said storage means to the inputs of said flip-flop means;

NOR gate means having two inputs and an output;

means connecting one input of said NOR gate means to said output of said first pulse stretcher means;

mean connecting the other input of said NOR gate means to said output of said flip-flop means;

amplifier means having an input and an output;

summing means having inputs and an output;

means connecting the inputs of said summing means to said outputs of said first and second pulse stretcher means and to said output of said NOR gate means;

means connecting the output of said summing means to the input of said amplifier means; and means connecting the output of said amplifier means to a transmission channel.

2. The system as set forth in claim 1 wherein said pulse stretchers are monostable multivibrators.

3. The system as set forth in claim 2 wherein said multilevel pulses have first and second levels for said binary data, a third level generated by the output of said second pulse stretcher, and a fourth level generated by the combined outputs of said first and second pulse stretchers.

4. The system as set forth in claim 3 wherein said receiver comprises second amplifier means having an input and an output, for receiving said multilevel pulses transmitted by said transmitting; D-C voltage bias means also connected to said second amplifier input, causing said second amplifier to generate an inverted and D-C level shifted version of said received signals; first, second an third comparators, responsive to the first, second and third levels for reconverting said multilevel signal to said binary data signal.

* * * * *